July 30, 1957 L. A. MEACHAM 2,801,288

EQUALIZING CIRCUIT

Filed March 29, 1956 2 Sheets-Sheet 1

INVENTOR
L. A. MEACHAM
BY W. L. Keefauver
ATTORNEY

July 30, 1957 L. A. MEACHAM 2,801,288

EQUALIZING CIRCUIT

Filed March 29, 1956 2 Sheets-Sheet 2

INVENTOR
L. A. MEACHAM
BY W. L. Keefauver
ATTORNEY

United States Patent Office 2,801,288

Patented July 30, 1957

2,801,288

EQUALIZING CIRCUIT

Larned A. Meacham, New Providence, N. J., assignor to Bell Telephone Laboratories, Incorporated, New York, N. Y., a corporation of New York Application March 29, 1956, Serial No. 574,713

9 Claims. (Cl. 179—81)

Figure 1:
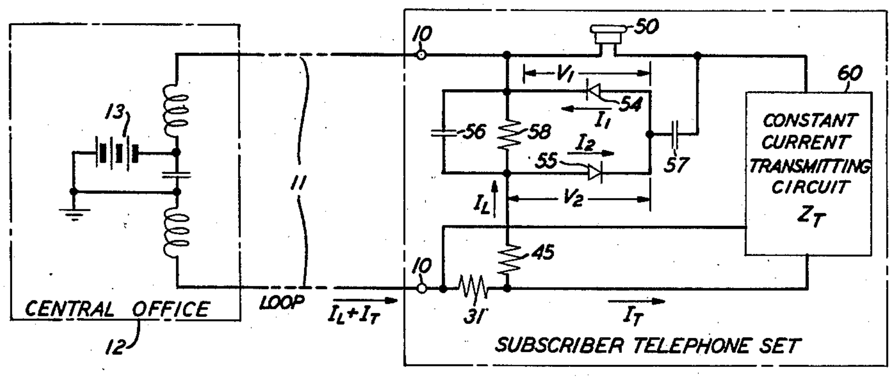

This invention relates to circuits for regulating the amplitude of signal energy applied to a load and in particular to loop equalization in telephone substations or the like.

An object of the invention is to equalize the amplitudes of signal currents applied to various loads connected by transmission lines, differing in length, to a central office.

In particular, it is an object of the present invention to equalize the amplitude of currents applied to telephone receivers in a telephone system where the loop current varies relatively slowly with changes in loop length.

Another object of the invention is to reduce second-order distortion in amplitude equalization circuits.

Still other objects of the invention relate to adapting the characteristics of available nonlinear resistance elements to equalization circuits requiring other degrees of nonlinearity.

The invention is described below, for illustrative purposes, in its relation to a telephone system in which receiving loop equalization is provided. Such equalization, per se, is not new and, in the past, has been obtained by the use of nonlinear resistance elements, such as thermistors or varistors shunted across the transmission path at or near the receiver. These resistance elements shunt an amount of direct current across the transmission path which varies inversely with loop length. On short loops, therefore, the shunting alternating-current resistance is fairly low, while on long loops the shunting alternating-current resistance is relatively high.

In certain telephone systems employing fairly large currents, the rate with which the direct-current voltage across the transmission path of the set varies with loop length and the amount of direct current that can be shunted through a varistor for loop equalization purposes are such that it is possible to use conventional nonlinear resistance elements of fairly low sensitivity, such as silicon carbide varistors. In certain other telephone systems employing relatively small currents and currents which are fairly constant with loop length, these conventional circuits are inadequate to provide sufficient equalization.

In accordance with an illustrative embodiment of the invention, described in more detail below, a pair of copper oxide varistors provide adequate receiving equalization in the substation circuits of a low current telephone system in which the substation circuits are designed to draw a constant current regardless of loop length. These varistors are connected in series aiding for direct currents, and biased by a voltage which is substantially proportional to the terminal voltage of the set. Since the signalling voltages are not negligible compared to the direct-current biasing voltage which controls the resistance of the varistors, the varistors are further connected in parallel opposition with each other and in shunt with the receiver for alternating currents, thereby balancing out second-order distortion products which might arise.

A feature of the invention is that the biasing voltage for the varistors is derived in such a manner that the constant current nature of the substation circuit is not disturbed.

Figure 2A:
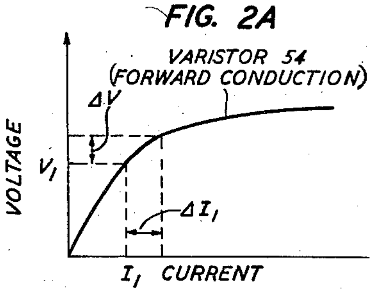
Figure 2B:
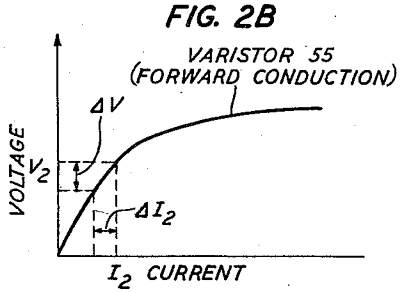
Figure 2C:
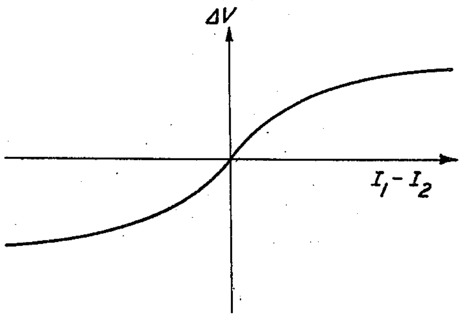
Figure 3:
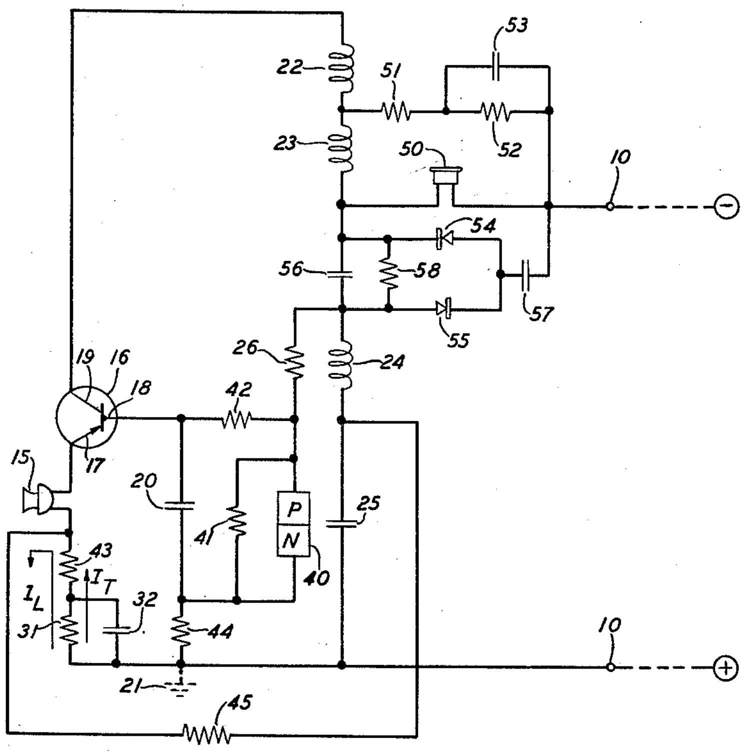

Various objects and features of the invention will be more fully understood from a reading of the following detailed description when taken in accordance with the attached drawings in which:

Fig. 1 is a simplified schematic diagram of a subscriber telephone set embodying principles of the invention;

Figs. 2A, 2B, and 2C are resistance characteristics which may aid in obtaining an understanding of the invention; and Fig. 3 is a detailed schematic diagram of a substation circuit which includes a receiving equalization circuit embodying principles of the invention.

Certain principles of the invention may be appreciated by first considering Fig. 1. This figure shows a subscriber telephone set, or substation circuit, whose set terminals 10 are connected by a transmission line or loop 11 to a central office 12. Included at the central office is a source of direct current 13 which provides the operating voltages and currents for all of the subscribers connected to the office.

In a certain electronic switching system in which the present invention might well find application, the direct currents drawn by the substation circuits are very small and, in fact, on the order of 7.5 milliamperes. More important, however, for present purposes, the substation circuits are designed to draw substantially the same current from the central office regardless of loop length. Conventional circuits for equalizing the volume of the signal currents applied to the receiver 50 are, therefore, found inadequate.

In the particular system mentioned, although the loop currents are held constant, the terminal voltages over the expected range of loop lengths vary on the order of 2 to 1, a voltage variation adequate to control the alternating-current resistance of a copper oxide varistor, for example, over a range sufficient for equalization purposes. A voltage approximately proportional to the terminal 10 voltage is applied to two varistors 54 and 55 by means of a voltage divider comprising resistors 45 and 58. The varistors are poled to conduct in their forward direction. As is known, nonlinear resistance elements, such as copper oxide varistors, are primarily voltage sensitive devices; that is, their resistance varies much more rapidly with changes in voltage than it does with changes in current. With the voltage applied to the varistors thus varying about 2 to 1, the current passing through them varies over a much wider range, say 20 to 1. A transmitting circuit, 60, which may include conventional sidetone balancing arrangements, is shown schematically as a functional block in Fig. 1. This circuit passes a direct current $I_T$ in shunt with the path that includes resistor 45, regulating such current with reference to a relatively low-valued sensing resistor 31 in such fashion that the total current $I_L+I_T$ drawn from the loop, and hence the voltage drop across resistor 31, is held constant. In order that this transmitting circuit may function properly, the current $I_L$ passing through the resistor 45 must never be more than a fraction of the total current. It follows that the current available to control the varistors is strictly limited.

The transmitting circuit 60 is effectively connected in series with the receiver 50, and presents an alternating-current impedance $Z_T$ to signal currents. In order that transmitting and receiving efficiencies may both be reasonably high, $Z_R$ and $Z_T$ must be of the same order of magnitude, and their sum must be roughly equal to the characteristic impedance of the transmission line 11. It follows that $Z_R$ is limited to a low magnitude, say a few hundred ohms, and since the varistors 54 and 55 are required to by-pass significant amounts of alternating-current signal around the receiver 50, they too must exhibit low resistances over at least part of their operating range.

With both the direct current available for the varistors and the range of resistance of these elements thus restricted, it follows that the controlling voltage across them must also be relatively small, and that little direct-current power can be dissipated in them for control. Copper oxide varistors are among the few elements which are sufficiently sensitive to provide adequate resistance variation at the required low direct-current power levels.

It may be noted that if resistor 58 were omitted, the biasing current flowing through the relatively high resistor 45 and directly through the varistors would vary substantially in proportion to the terminal voltage, and since these devices are primarily voltage sensitive, as noted, the 2 to 1 variation in biasing current would not provide sufficient changes in the alternating-current resistance of the varistors for adequate equalization. Accordingly, it is essential that resistor 58 be present and that it have a resistance little or no greater than the minimum direct-current resistance acquired by the varistors.

Since it is the receiver 50 which is to be equalized, the varistors are connected in shunt with the receiver for alternating currents by capacitors 56 and 57. Being in parallel opposition with each other, for signal currents, second-order distortion products, which might arise since the signal voltages are far from negligible with respect to the biasing voltage across resistor 58, are balanced out. This may be understood by referring to Figs. 2A, 2B, and 2C.

Figs. 2A and 2B illustrate the forward conduction characteristics of varistors 54 and 55, respectively. It is assumed that these two devices have identical characteristics. The biasing voltages across the varistors, due to voltage drop across resistor 58, are $V_1$ and $V_2$ and the currents through the two varistors are $I_1$ and $I_2$. In the absence of alternating-current signals, $I_1$ is equal to $I_2$, and since the varistor characteristics are identical, $V_1$ and $V_2$ are also equal. A signal voltage fluctuation of $\Delta V$, superimposed on these biasing voltages, will result in an increase in the current $I_1$ of $\Delta I_1$, and a decrease in the current $I_2$ of $\Delta I_2$. A superimposed voltage of the opposite polarity will produce the opposite results. If $I_1 - I_2$, the net signal current shunted around the receiver 50, is plotted against $\Delta V$, as in Fig. 2C, it may be seen that a symmetrical characteristic results: This is important, as noted above, where the biasing voltage applied to the varistors is not sufficiently large with respect to signal voltage swings, $\Delta V$, to prevent distortion from arising. With the symmetrical characteristic, however, the signal voltage swings will lie on the relatively linear part of the Fig. 2C curve near the intersection of the axes, so that second-order distortion products will cancel.

A substation circuit, in which the receiving equalization circuit, described with reference to Fig. 1, is employed, is illustrated in Fig. 3. Elements similar to those in Fig. 1 have been similarly numbered. This substation circuit was, in fact, specifically designed to insure a 7.5 milliampere loop current. With such a small current, the output of the carbon microphone 15, unmodified, would be very low. The transmitted speech currents are, therefore, amplified by a transistor 16 having an emitter 17, a base 18, and a collector 19. So far as speech currents are concerned, the transistor is connected in common base configuration by virtue of the capacitor 20. The load is coupled between the collector 19 and what, for discussion purposes, may be considered an alternating-current "ground" at point 21 by an auto-transforming arrangement comprising the line coils 22, 23, and 24 which may have a winding ratio of 1:1:1. This autotransformer arrangement, it might be noted, effectively steps up the alternating-current loop impedance to a value properly related to the relatively high collector impedance of the transistor so as to achieve maximum modulation efficiency. This is more fully disclosed in a copending application of L. A. Meacham, Serial No. 461,145, dated October 8, 1954. Capacitor 25 serves to block direct currents.

The transistor is biased, however, in what might be considered common emitter configuration with all operating voltages derived from the source of direct current at the Central Office (battery 13 in Fig. 1) by a voltage divider comprising resistor 26 and diode 40. The collector 19 is connected to one end of the divider, the emitter 17 to the other end, and the base 18 to a junction intermediate resistor 26 and diode 40.

For the purpose of stabilizing the emitter current against variations in $I_{c0}$, temperature or the like, a feedback or sensing resistor 31 is connected in series with the transmitter and in the direct-current emitter-base path. Direct-current stabilization is provided by the negative feedback voltage developed across this resistor. This resistor is by-passed by a capacitor 32 for speech currents and acts much in the manner of a cathode biasing resistor. It is sufficient in magnitude, however, so that the potential of the emitter tends to approach that of the base and is held thus by the negative feedback action.

Transmitting equalization, as described more fully in a copending application of A. Busala-L. A. Meacham, Serial No. 574,712, filed of even date herewith, is obtained by causing a current independent of both the transistor 16 and the transmitter 15 to flow through the biasing resistor 31. This current is derived from the line by an auxiliary circuit including a resistor 45. It should be noted that this auxiliary path, which may be traced from the negative line terminal through coils 23 and 24, resistor 45, resistor 31, and thence to the positive line terminal, is independent of both the transistor 16 and the transmitter 15. With the addition of this auxiliary circuit, the total current in the biasing resistor 31 is composed of two parts designated $I_T$, the transistor component, and $I_L$, the line current component.

To insure the 7.5 milliampere loop current, a substantially constant potential of about 10 volts is applied to the base. This is accomplished by applying a reference potential obtained from a breakdown diode 40, to the base of the transistor. This diode, which may comprise a p-n junction diode of the type described in an article by Messrs. F. H. Chase, B. H. Hamilton, and D. H. Smith, entitled "Transistors and junction diodes in telephone power plants," Bell System Technical Journal for July 1954, volume 33, at page 827, is characterized by a reverse breakdown region in which it exhibits a substantially constant voltage regardless of applied current. This device was specifically designed for a breakdown at about 10 volts, and operates, over most of the expected range of loop currents, in its breakdown region, thereby providing a reference potential of 10 volts. Since the transistor is self biasing, due to resistor 31, the potential across the diode is approximately duplicated across resistor 31 which in one embodiment had a value of about 1400 ohms, thus insuring a 7.5 milliampere set current. (These potentials are measured with respect to the arbitrary reference point 21, shown in Figs. 2 and 3.) Diode 40, therefore, cooperates with resistor 26 to form a voltage divider across the line for the purpose of supplying the proper operating voltages to the electrodes of the transistor 16.

Since a substantially constant voltage is applied to the base 18, the transistor, by negative feedback action, will tend to hold the voltage across resistor 31 constant regardless of loop length. The fraction of this voltage due to the line current component $I_L$ will, however, vary inversely with loop length. Less current will, therefore, be required of the transistor on short loops and, since the transistor Current $I_T$ is also the transmitter current, it may be seen that the transmitter equalization is obtained. That is, the current in the transmitter is reduced on short loops, thus reducing the power transmitter output which is roughly a linear function of current squared.

On longer loops, or, when two or more sets are off-hook on the same loop, the collector potential tends to approach that of the base. This would result in overload distortion of the voice signal. In order to correct this condition, a resistor 41 is bridged across the diode to guarantee the existence of a base-collector voltage sufficient for proper operation.

On longer loops, the terminal voltage may be insufficient to maintain breakdown in diode 40. For currents above breakdown, the alternating-current resistance of the diode 40 is substantially zero. For currents below this value, diode 40 has a very large alternating-current impedance; capacitor 20, however, effectively by-passes this high impedance.

In the region of the knee of the breakdown characteristic of diode 40, an effect similar to noise is realized. To reduce this noise, a resistor 42 is placed in series with the base to effectively absorb the noise voltage.

For the carbon transmitter 15 to operate efficiently, it should be loaded by an impedance approximately equal to its resistance with no sound pressure. In the illustrated circuit, this necessitated the addition of a small unbypassed resistor 43 in series with the transmitter, together with the somewhat larger resistor 31 which is by-passed by capacitor 32. In one embodiment, resistor 43 was 62 ohms while resistor 31 was 1400 ohms.

Since the output impedance of a common base transistor amplifier is much higher than the loop impedance, a small amount of negative feedback is introduced to lower this output impedance so as to more nearly match the impedance of the loop which is on the order of one thousand ohms. This feedback is conveniently obtained by including a resistor 44 in series, for speech currents, with the parallel combination of capacitor 20 and diode 40-resistor 41. These elements, together with resistor 26, form a voltage divider, for speech currents, across that part of the output appearing across coil 24 (roughly one-third of the output), with the voltage appearing across resistor 44, due to the output signal, being of such phase as to apply a small negative feedback voltage to the base. Resistor 44 tends to upset the constant base voltage condition which diode 40 attempts to achieve but has such a small value relative to the direct-current resistance of the diode 40-resistor 41 combination that its effect in this respect is negligible.

Resistors 51 and 52, and capacitor 53 comprise a sidetone balancing network for the receiver 50.

The remaining elements in the figure, elements 54, 55, 56, 57, and 58, comprise in conjunction with resistors 31 and 45 the receiving equalization circuit for the receiver 50 which was described with reference to Fig. 1. As described, this circuit acts to shunt the receiver with an impedance which varies inversely with loop length.

Resistor 58, across which is developed the varistor 54 and 55 biasing voltage, is included in a relatively high resistance path, the two ends of which respond to changes in terminal voltage. This path, which is the auxiliary path noted above when discussing transmitting loop equalization, may be traced from the negative line terminal through the receiver, and associated sidetone balancing networks, resistor 58 and associated varistor networks, line coil 24, and resistors 45, 43, and 31. Resistors 31 and 45, in one specific embodiment, were 1400 ohms and 4700 ohms, respectively (resistor 58 was 160 ohms), so that this shunt path, although drawing a current varying with terminal voltage, draws a current sufficiently small that the constant current character of the substation circuit as a whole is not appreciably affected. Resistor 58, therefore, acts much as a "voltage source" for the varistors, translating the auxiliary current $I_L$ variations into voltage variations for biasing the predominantly voltage sensitive devices 54 and 55. As noted above with respect to Fig. 1, this expedient causes the current flowing through the varistors to vary at a much more rapid rate than either the current flowing directly through resistor 58 or the current which would flow through the varistors were resistor 58 omitted.

Although the invention has been described in its relation to certain specific embodiments, the invention should not be deemed limited to these embodiments since numerous other embodiments and modifications will readily occur to one skilled in the art without departing from either the spirit or scope of the invention.

What is claimed is:

1. In a telephone system comprising a central office, a source of direct current at said central office, and a plurality of substation circuits connected by transmission lines to said central office and receiving current from said source, the combination wherein each of said substation circuits includes a receiver coupled to receive speech energy from its associated transmission line and equalizing means for adjusting the level of the sound delivered by said receiver in accordance with the length of the line connecting its associated substation circuit to said central office, said equalizing means comprising a pair of unilaterally conducting impedance elements having nonlinear forward conducting characteristics, means connecting said impedance elements in series-aiding for direct currents with said source, said impedance elements poled to conduct in their forward direction and a pair of capacitors connecting said impedance elements in parallel, for alternating currents, with said receiver, said impedance elements being oppositely poled for alternating currents with respect to said receiver.

2. The combination in accordance with claim 1 wherein said impedance elements comprise copper oxide varistors.

3. The combination in accordance with claim 1 and a resistor connected in shunt, for direct currents, with said impedance elements.

4. In combination: a signal source including a source of direct current, a load having a pair of terminals, transmission means for delivering signals and direct current from said source to said load and means for adjusting the signal energy delivered to said load in accordance with the impedance of said transmission means, said adjusting means comprising a pair of unilaterally conducting impedance elements having nonlinear forward conducting characteristics, means for connecting said impedance elements in series with said source, said devices being poled to conduct in their forward direction, and means for connecting said impedance elements in parallel with said receiver for signal energy, said impedance elements being oppositely poled for signal currents with respect to said receiver.

5. The combination in accordance with claim 4 and a resistor connected in shunt for direct currents with said pair of impedance elements.

6. In combination: a transducer coupled by a transmission line to a remote location, a source of direct current at said remote location, and equalization means for shunting said transducer with an impedance which varies indirectly with the magnitude of the direct current at said transducer comprising a pair of asymmetrically conducting impedance devices having nonlinear conduction characteristics over an operating range, means connecting said devices in parallel opposition with each other across said transducer for alternating currents and means connecting said devices in series-aiding with said source for direct currents.

7. In a telephone substation circuit having a two-terminal receiver connected to receive speech energy from a transmission line, said transmission line extending to a remote location which includes a source of direct current, means connecting one terminal of said receiver to one side of said line, means connecting the other terminal of said receiver to the other side of said line, a pair of voltage sensitive resistance elements connected in series for direct currents with said source, a resistor shunting both of said resistance elements, a first capacitor shunting said resistor and connected between said one terminal of said receiver and said one side of said line, and a second capacitor connected between the junction of said resistance elements and said other side of said line.

8. The combination in accordance with claim 7 wherein said voltage sensitive resistance elements comprise copper oxide varistors.

9. In a telephone system comprising a central office including a source of direct current, and a plurality of substation circuits located at various distances from said office, and transmission means for connecting said substation circuits to said central office, said substation circuits each including a transmitting circuit including a transmitter, a receiving circuit including a receiver, and a receiving equalizing circuit comprising a pair of voltage sensitive resistance elements, means for deriving a biasing voltage for said resistance elements comprising an auxiliary circuit including a resistor connected to draw a current proportional to the terminal voltage of its associated substation circuit and means for applying the voltage developed across said resistor across said voltage sensitive resistance elements.

No references cited.